United States Patent [19]

Brjukhov et al.

[11] 4,167,119

[45] Sep. 11, 1979

[54] APPARATUS FOR MEASURING FREQUENCY OF ROTATION OF A SHAFT

[75] Inventors: Boris F. Brjukhov, Chelyabinskaya oblast; Nikolai B. Buchin; Vasily P. Shilov, both of Chelyabinsk, all of U.S.S.R.

[73] Assignee: Nauchno-Issledovatelsky I Proektno-Konstruktorsky Institut Po Dobyche, Chelyabinsk, U.S.S.R.

[21] Appl. No.: 890,695

[22] Filed: Mar. 27, 1978

[51] Int. Cl.² ............................ G01P 1/04; G01P 3/48
[52] U.S. Cl. ...................................... 73/488; 73/527; 235/104
[58] Field of Search ................. 73/488, 491, 518, 527; 324/160; 235/104

[56] References Cited

U.S. PATENT DOCUMENTS

| 749,743 | 1/1904 | McQuown | 73/491 X |
| 1,626,697 | 5/1927 | Rodanet | 235/104 |
| 2,097,215 | 10/1937 | Rodanet | 235/104 |

Primary Examiner—James J. Gill

Attorney, Agent, or Firm—Burgess, Ryan and Wayne

[57] ABSTRACT

An apparatus for measuring frequency of rotation of a shaft, connectable to this shaft through a reducing gear having a solenoid clutch at the output thereof, has the output shaft of this solenoid clutch associated with a driver and a return spring. The driver is adapted to rotate a memory mechanism through an actuator fast with the shaft of this mechanism. The shaft of the memory mechanism carries an indicator of the frequency of rotation of the shaft and an overrunning clutch operatively connected with a solenoid brake controlled by a pulse generator. The pulse generator is successively connectable to the solenoid clutch to perform a measurement of the frequency of rotation of the main shaft, and to the outer cage of the overrunning clutch to register the frequency of rotation of the shaft, which is being measured. The apparatus is usable in all kinds of industrial and other applications, wherever the frequency of rotation of a shaft is to be monitored, particularly, in an environment characterized by the presence of distortion and vibration.

1 Claim, 1 Drawing Figure

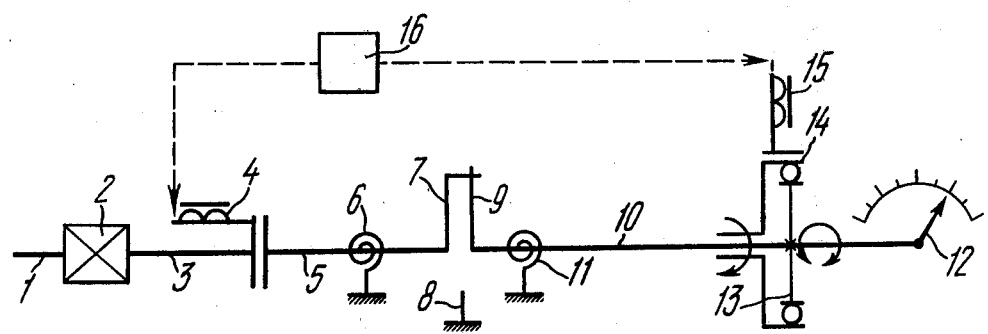

APPARATUS FOR MEASURING FREQUENCY OF ROTATION OF A SHAFT

The invention relates to the art of measurements, and particularly it relates to apparatus for measuring or monitoring the frequency of rotation of shafts of mechanisms and can be used in various industries where the frequency of rotation of a shaft is to be monitored, especially, in an environment characterized by the presence of random distortions, e.g. an environment associated with rotational drilling of boreholes.

There is known an apparatus for measuring the frequency of rotation of a shaft (see, for example, "Automation of Deep Drilling Process" by A. A. Pogarski, "NYEDRA" Publishers, Moscow, 1972). The apparatus includes a reducing gear operatively connected with the main shaft of which the frequency of rotation is to be measured. The reducing gear is further connected with a solenoid clutch of which the output shaft is associated with a driver and a return spring. The driver is adapted to operate a memory mechanism through an actuator. The memory mechanism includes a shaft with a return spring, a solenoid-operated brake connected with an indicator of the frequency of rotation of the shaft, and a pulse generator connected to the solenoid brake.

Upon the pulse generator sending a control pulse to the solenoid clutch, the rotation of the shaft being monitored is transmitted through the reducing gear and the solenoid clutch to the memory mechanism. The shaft of the memory mechanism rotates through a certain torsion angle, jointly with the indicator of the frequency of rotation, and the pulley of the brake connected therewith, the value of this angle being repesentative of the frequency of rotation of the shaft being monitored, whereafter the shaft of the memory mechanism is arrested by the pulley of the solenoid-operated brake. With the measurement cycle completed, the solenoid clutch is deenergized, while the indicator of the frequency of rotation of the shaft, retained by the solenoid brake, reads the mean value of the frequency of rotation of the shaft being monitored per the time of duration of the control pulse. Following a preset interval, the measurement cycle is repeated.

A disadvantage of the abovedescribed known apparatus is the insufficiently reliable retaining of the brake drum by the solenoid brake, which has been found to affect the measurement accuracy. With the braking torque being applied to the brake drum being reduced, the retaining of the memory mechanism becomes somewhat inaccurate and unreliable, while with the braking torque being increased, the efforts applied to the components of the apparatus are increased accordingly, which affects the latter's reliability.

It is, therefore, an object of the present invention to step up the measurement accuracy and to improve the reliability of the construction of the apparatus.

It is another object of the present invention to provide a construction of an apparatus for measuring frequency of rotation of a shaft, wherein the value of the braking torque applied to the brake drum should not affect the accuracy of the retaining of the memory mechanism.

These and other objects are attained in an apparatus for measuring the frequency of rotation of a shaft, having a solenoid-operated clutch provided at the output thereof, the output shaft of this solenoid clutch being associated with a return spring and a driver adapted to operate a memory mechanism through an actuator, the memory mechanism including a shaft with a return spring, connected with means for retaining an indicator of the frequency of rotation of the shaft, a solenoid-operated brake operatively connected with the indicator of the frequency of rotation of the shaft to arrest it in the indicating position during the measurement, and a pulse generator connected to the solenoid-operated brake, in which apparatus, in accordance with the present invention, the means retaining the indicator of the frequency of rotation of the monitored shaft includes an overrunning clutch of which the internal cage is fast with the indicator of the frequency of rotation, and the external cage is operatively connected with the solenoid-operated brake, the pulse generator being connectable, first, with the solenoid-operated clutch to measure the frequency of rotation of the monitored shaft and then with the solenoid brake to brake the overrunning clutch, whereafter the pulse generator is turned off, whereby the measured frequency of rotation of the monitored shaft is registered.

With the apparatus for measuring the frequency of rotation of a shaft having the herein disclosed construction, the performance of the apparatus can be made more reliable, and the accuracy of its measurement can be enchanced significantly.

The present invention will be further described in connection with an embodiment thereof, with reference being had to the accompanying drawing showing schematically the drive diagram of an apparatus for measuring the frequency of rotation of a shaft, constructed in accordance with the invention.

In the drawing, the disclosed apparatus for measuring the frequency of rotation of a shaft 1 being monitored comprises a reducing gear 2 and a shaft 3 engageable through a solenoid-operated clutch 4 with a shaft 5. The shaft 5 has secured thereto a return torsion spring 6 and a driver 7 which is adapted to abut against an abutment 8 provided on the housing of the apparatus when the frequency of rotation of the shaft 1 equals zero. Normally, the drive 7 is adapted to displace an actuator 9 fast with the shaft 10 of a memory mechanism including the said shaft with the actuator 9 and a torsion return spring 11 connected to the shaft 10, the latter having mounted on the end thereof the indicator 12 of the frequency of rotation of the shaft 1 being monitored. As a means adapted to retain the indicator 12 of the frequency of rotation of the shaft 1, the herein disclosed apparatus includes an overrunning clutch mounted on the shaft 10 and having an internal cage or race 13 fast with the shaft 10 and an external cage or race 14 associated with a normally engaged solenoid-operated brake 15. This solenoid-operated brake 15 is controlled by a pulse generator 16.

In operation, the rotation of the shaft 1 being monitored is transmitted via the reducing gear 2 to the shaft 3. With the pulse generator 16 feeding a control pulse of a predetermined duration or width to the solenoid clutch 4, the shaft 3 becomes coupled to the shaft 5. This rotation of the shaft 5 strains the torsion return spring 6, while the driver 7 rotates via the actuator 9 the shaft 10 of the memory mechanism, jointly with the indicator 12 of the frequency of rotation of the monitored shaft 1, fast with the shaft 10. The torison return spring 11 is strained accordingly. With the abovementioned control pulse discontinued, the shaft 3 and 5 become uncoupled, and the action of the strained return spring 6 returns the shaft 5 into its idle position whereat the driver 7 abuts against the abutment 8. Meanwhile, the overrunning clutch has its outer cage 14 braked by the action of the solenoid-operated brake 15, which means that the shaft 10 cannot be returned into its initial position by the return spring 11. In this way the indicator 12 of the frequency of rotation of the shaft 1 being monitored is retained in a position corresponding to the angle of rotation of the shaft 1 being monitored during the presence of the abovementioned control pulse fed by the generator 16. With the generator 16 sending a successive control pulse to the solenoid clutch 4, the abovedescribed measurement cycle is repeated.

Should the new angle of rotation of the shaft 1 being monitored over this successive measurement cycle fall short of the previous angle of rotation, the driver 7 would stop short of the actuator 9 arrested by the action of the engaged solenoid-operated brake 15 at the end of the previous measurement cycle in the position registering the previously measured frequency of rotation of the shaft 1. To return the actuator 9 into engagement with the driver 7, the generator 16 is programmed to send, prior to the termination of the control pulse fed to the solenoid clutch 4, a short-duration pulse to the normally engaged, solenoid-disengageable brake 15, whereby the external cage 14 of the overrunning clutch becomes monmentarily released. Consequently, the action of the return spring 11 rotates the shaft 10 in the reverse or lesser indication direction until the actuator 9 engages the driver 7, in which way the new reading of the indicator 12 of the frequency of rotation of the shaft 1 being monitored is registered.

Alternatively, if the angle of rotation of the shaft 1 during a successive measurement cycle exceeds the angle corresponding to the previous indication, the driver 7 engages the actuator 9 and rotates the shaft 10 with the indicator 12 through a further increment, until the control pulse sent by the pulse generator 16 to the solenoid clutch 4 is discontinued. This rotation of the shaft 10 in the right-hand or greater indication direction is unopposed by the free rotation of the internal cage 13 of the overrunning clutch. With the control pulse terminated, the external cage 14 of the overrunning clutch is rebraked by the action of the solenoid-operated brake 15, and the new angular position or reading of the indicator 12, corresponding to the recent angle of rotation of the monitored shaft 1, is registered.

Thus, in the apparatus for measuring the frequency of rotation of the shaft 1, embodying the invention, the accuracy and reliability of registering the measured frequency of rotation of this monitored shaft 1 are influenced solely by the operability of the overrunning clutch. An increased braking torque applied to the braking rim of the overrunning clutch, far from affecting the accuracy of the operation of the apparatus, enhances the reliability of the registering of the current indication of the frequency of rotation of the monitored shaft, which is particularly important when the apparatus is operated under the conditions of complex vibration of the mechanism wherein the frequency of rotation of a shaft is to be monitored.

What we claim is:

1. An apparatus for measuring the frequency of rotation of a shaft, comprising:
   reducing gear connected to said shaft of which the frequency of rotation is to be measured;
   a solenoid-operated clutch having an input shaft and an output shaft, said input shaft being connected with said reducing gear;
   a return spring mounted on said output shaft of said solenoid-operated clutch;
   a driver fast with the end of said output shaft of said solenoid-operated clutch;
   a memory mechanism including:
     an overrunning clutch having an input shaft and an output shaft;
     an actuator coupled in driven relationship with said driver, said actuator being fast with the end of the input shaft of said overrunning clutch;
     a return spring mounted on said input shaft of said overrunning clutch;
     an internal cage of said overrunning clutch mounted on either one of said shafts thereof;
     an external cage of said overrunning clutch mounted on the other one of said shafts thereof for rotation relative to said internal cage;
     a solenoid-operated brake having an electric input and a mechanical output operatively connected with said external cage of said overrunning clutch;
   a pulse generator having two outputs of which one is connected to said solenoid-operated clutch and the other one is connected to said electric input of said solenoid-operated brake; and
   an indicator of the frequency of the rotation of said first-mentioned shaft, having the indicating member thereof fast with said input shaft of said overrunning clutch.

* * * * *

UNITED STATES PATENT AND TRADEMARK OFFICE
CERTIFICATE OF CORRECTION

PATENT NO. : 4,167,119
DATED : September 11, 1979
INVENTOR(S) : Boris F. Brjukhov, et al It is certified that error appears in the above—identified patent and that said Letters Patent is hereby corrected as shown below:

Column 2, line 27: "enchanced" should be --enhanced--.

line 65: "torison" should be --torsion--.

Column 3, line 27: "monmentarily" should be --momentarily--.

Signed and Sealed this

Fifteenth Day of April 1980

[SEAL]

Attest:

SIDNEY A. DIAMOND

Attesting Officer        Commissioner of Patents and Trademarks